(12) United States Patent
Alshawi

(10) Patent No.: US 7,693,829 B1
(45) Date of Patent: Apr. 6, 2010

(54) SEARCH ENGINE WITH FILL-THE-BLANKS CAPABILITY

(75) Inventor: Hiyan Alshawi, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 549 days.

(21) Appl. No.: 11/114,971

(22) Filed: Apr. 25, 2005

(51) Int. Cl.
*G06F 7/00* (2006.01)
*G06F 17/30* (2006.01)

(52) U.S. Cl. .................................... 707/3; 707/5; 707/7

(58) Field of Classification Search ............... 707/1–10, 707/100–104.1, 200–206
See application file for complete search history.

(56) References Cited

U.S. PATENT DOCUMENTS

| | | | |
|---|---|---|---|
| 5,724,571 | A * | 3/1998 | Woods ........................... 707/5 |
| 6,295,526 | B1 | 9/2001 | Kreiner et al. .................. 707/2 |
| 2002/0129014 | A1* | 9/2002 | Kim et al. ....................... 707/5 |
| 2004/0249808 | A1* | 12/2004 | Azzam et al. ................... 707/4 |

OTHER PUBLICATIONS

Singhal et al, Pivoted Document Length Normalization (2001).*
Coch, Evaluating and comparing three text-production techniques, 1996, ACM, vol. 1, 249-254.*
Aliod et al., A real world implementation of answer extraction, Aug. 26-28, 1998, IEEE, 143-148.*
Prager., Linguini: language identification for multilingual documents, Jan. 5-8, 1999, IEEE, Volume Track2, 11 pp.*
Radev, D., et al. "Mining the Web for Answers to Natural Language Questions," ACM CIKM 2001: 10th Int'l Conf. on Information and Knowledge Management, 2001, 8 pages.
Brill, E., et al., "Data-Intensive Question Answering," Proceedings of the TREC-10 Conference, NIST, Gaithersburg, Maryland, 2001, pp. 183-189.
Moldovan, D., et al., "The Structure and Performance of an Open-Domain Question Answering System," Proceeding of the Conference of the Association for Computational Linguistics (ACL-2000), 2000, pp. 563-570.

* cited by examiner

*Primary Examiner*—Jean B Fleurantin
(74) *Attorney, Agent, or Firm*—Morgan, Lewis & Bockius LLP

(57) ABSTRACT

A method of searching for information is described. A sequence of terms, including one or more term segments and one or more identifiers corresponding to one or more missing terms, is received. The sequence of terms is converted into a corresponding search pattern, including a set of one or more query expressions and one or more ordering constraints. The search pattern is compared with a plurality of documents to identify a set of documents. Match scores for one or more matches between the search pattern and documents in the set of documents are determined. Content in the set of documents corresponding to the one or more missing terms in the search pattern are identified and a ranked set of information items containing the identified content is provided in accordance with the match scores.

31 Claims, 17 Drawing Sheets 1514  1516  1518

1500

| Term | Synonym | Weight |
|---|---|---|
| Term 1 | Synonym 1 | 0.1 |
| Term 1 | Synonym 2 | 0.7 |
| ⋮ | ⋮ | ⋮ |
| Term N | Synonym N | 0.3 |

SEARCH ENGINE WITH FILL-THE-BLANKS CAPABILITY

FIELD OF THE INVENTION

The present invention relates generally to search engines, such as Internet and Intranet search engines, and more specifically to search engines with fill-the-blanks capability in processing search queries.

BACKGROUND

Search engines provide a powerful tool for locating content in documents in a large database of documents, such as the documents on the Internet or World Wide Web (WWW), and/or the documents stored on the computers of an Intranet. The documents are located using an index of documents in response to a search query, consisting of one or more words, terms, keywords and/or phrases, henceforth called terms, that are submitted by a user. Documents in the index of documents may be matched to one or more terms in the search query to determine scores. A ranked listing of relevant documents or document locations, based on the scores, are provided to the user.

Search queries may have a variety of formats. Common formats include a list of terms and/or Boolean search commands. Another class of formats correspond to fill-the-blanks questions, where a user would like to know one or more blanks or missing terms in a snippet or a fragment of text. Existing search engine systems may transform the fill-the blanks questions into natural language questions, i.e., questions having a declarative format.

Natural language questions, however, have several drawbacks. Notably, the transformation from a fill-the-blank question to a natural language question or query often uses complex language-specific rules and processing for each language covered. Natural language questions are often answered using a body of knowledge or an expert system, which may add complexity and expense to a search engine. And the unrestricted nature of natural language questions may raise the users expectations beyond the capability of the search engine to provide answers, relevant documents or document locations in response to the query. There is a need, therefore, for a search engine with improved processing of queries based on fill-the-blanks questions.

SUMMARY

A method of searching for information is described. A sequence of terms, including one or more term segments and one or more identifiers corresponding to one or more missing terms, is received. The sequence of terms is converted into a corresponding search pattern, including a set of one or more query expressions (each corresponding to a term segment) and one or more ordering constraints. The search pattern is compared with a plurality of documents to identify a set of documents. Match scores for one or more matches between the search pattern and documents in the set of documents are determined. Content in the set of documents corresponding to the one or more missing terms in the search pattern are identified and a ranked set of information items containing the identified content is provided in accordance with the match scores.

Providing the ranked set of information items may include providing a ranked set of documents containing the identified content in accordance with the match scores. In some embodiments, the ordering constraints may specify one or more re-orderings of the terms in the sequence of terms. In some embodiments, the length of a filler text portion of the identified content may be limited or truncated in accordance with the content scores of candidate filler terms.

A respective match score for a respective document in the set of documents may be based on a content score for the identified content in the respective document and a content score for padding between query terms (within a query expression) in the identified content. The term "padding" refers to words in the identified content that are positioned between terms in a query expression of the search pattern. In some embodiments, the respective match score may be further based on weights of one or more synonyms used in converting one or more term segments in the sequence of terms into one or more query expressions. In some embodiments, the respective match score may be a weighted summation of the content score for the filler text of the identified content in the respective document, the content score for padding between query terms in the search pattern and the weights of the one or more synonyms.

The method may include determining document scores for the set of documents. The respective document score may be based on a highest match score and a total number of matches between the search pattern and the respective document in the set of documents. The respective document score may be further based on a quality of document metric. In some embodiments, the respective document score is a weighted summation of the highest match score, the total number of matches between the search pattern and the respective document, and the quality of document metric.

The method may include determining, for the identified content in a respective document, a relative frequency of the document's identified content in the set of documents, and determining an adjusted document score for the respective document. In some embodiments, the relative frequency of the identified content may be represented by the value obtained by dividing the number of documents (in the set of identified documents matching the search pattern) having the same key word as the identified content to the total number of documents in the set of identified documents matching some or all of the terms in the search pattern. An adjusted document score for a respective document may be based on the document score for the respective document and the relative frequency of the identified content of the document. In some embodiments, the adjusted document score for the respective document may be a product of the document score of the document and the relative frequency for the identified content of the document.

The method may include receiving one or more context terms. The one or more context terms may be used to determine rankings of the information items, in converting the sequence of terms into the search pattern and/or to filter the plurality of documents.

The method may include converting one or more of the term segments into respective query expressions, including mapping one or more term segments into one or more paraphrases, or mapping one or more terms in the term segments into a set of synonyms.

The method may include displaying snippets of text in the ranked set of information items. In some embodiments, the method may include highlighting the identified content in the snippets of text.

In an alternate embodiment of searching for information, the sequence of terms is provided. A ranked set of information items corresponding to the one or more missing terms in the sequence of terms is received. Upon selection of a respective information item in the ranked set of information items, a ranked list of corresponding documents containing the selected information item is received.

BRIEF DESCRIPTION OF THE DRAWINGS

For a better understanding of the invention, reference should be made to the following detailed description taken in conjunction with the accompanying drawings, in which:

FIG. 14 is a block diagram illustrating an embodiment of a synonym data structure.

Like reference numerals refer to corresponding parts throughout the drawings.

DETAILED DESCRIPTION OF EMBODIMENTS

Figure 1A:
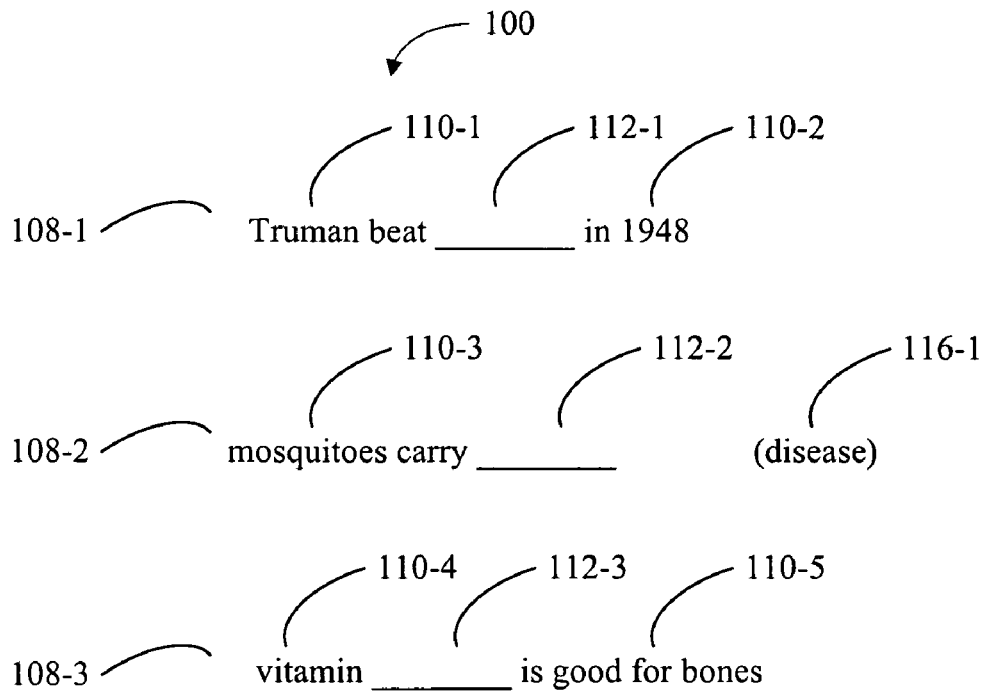
FIG. 1A is a block diagram illustrating an embodiment with several fill-the-blank queries.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

A method of searching for information using heuristic techniques in response to search queries having a fill-the-blanks format is described. A search query having a sequence of terms, including one or more term segments and one or more missing term identifiers corresponding to one or more missing terms, is received from a user and converted into a corresponding search pattern. Each term segment may include one or more terms. Each term segment includes all the terms between two successive missing term identifiers in the search query, or includes all the terms between the beginning or end of the search query and a closest missing term identifier.

The search pattern includes one or more query expressions and one or more ordering constraints. An ordering constraint specifies which term orders (also herein called word orders), in addition to the word order in the original specified query, will be considered to fall within the scope of the search pattern. For instance, in a search segment having the sequence of terms A B C D E, the ordering constraints may specify that the first and second terms may appear in either order, A B or B A. In another example, the ordering constraints in a fill-the-blank query having the form A B C _ D E may specify that order of any pair of terms in any of the sequences of terms (i.e., A B C and D E) may be reversed. In some embodiments, an ordering constraint only applies to the order of the terms within each search segment of a search pattern. In other words, in these embodiments, the ordering constraints, terms do not allow for terms to be switched from one search segment to another, because it is presumed that moving a term from one search segment to another would fundamentally change the query. In other embodiments, however, an ordering constraint may specify the extent to which the terms in a query may be moved from one search segment to another, or equivalently an ordering constraint may specify the extent to which terms in a query may be re-ordered with respect to the missing term identifier(s) of the query.

In some embodiments, the search pattern includes one or more padding constraints. An exemplary padding constraint would be that no more than two words may be positioned between any two adjacent terms in any of the query expressions of the search pattern. The term "padding" refers to words in an identified document that are positioned between terms in a query expression of the search pattern. For example, if a search pattern includes the query expression "George Bush", any words between the terms "George" and "Bush" in the identified content of a document would be considered to be padding words. If the search pattern includes a padding constraint of two words, then the text "George Herbert Walker Bush" matches the query expression "George Bush", while the text "George went to school with his friend Paula Bush" would not match the query expression. In some embodiments, the query conversion process uses one or more synonyms (substituting alternate words) and/or one or more paraphrases (re-ordering of two or more term segments) to generalize the search pattern.

The search pattern is compared with a set of documents, for example, in a document index or a document database, using textual pattern matching techniques. In some embodiments, the matches do not have to be exact. Approximate text matching techniques such as n-gram overlap and/or edit distance may be used. A set of documents having one or more matches with the search pattern are identified. As will be explained in more detail below, match scores for one or more of the matches are determined, a document score for each of the documents is determined, and an adjusted document score for the documents is determined. Based on the match scores, the document scores and/or the adjusted document scores, filler text in the set of documents corresponding to the one or more missing terms is identified and a ranked set of information items containing the identified filler text may be provided to the user. The ranked set of information items may include a ranked set of documents.

In some embodiments, one or more context terms are also received from the user. The one or more context terms may be used to convert the search query into the search pattern, to determine the ranking of the information items and/or to filter the identified matching set of documents.

FIG. 1A illustrates an embodiment 100 with several fill-the-blank queries 108. The fill-the-blank queries 108 have the sequence of terms, including one or more term segments 110 and one or more identifiers 112 corresponding to one or more missing terms. The fill-the-blank queries 108 are fragments of natural language text, such as a phrase or a sentence. The one or more identifiers 112 are blank symbols signifying missing information sought by the user. Fill-the-blank query 108-2 also includes a context term 116. The context term 116 may be used to specify one or more categories or topics that correspond to the fill-the-blank query 108. The one or more categories may be used to narrow the set of documents to which the search query is compared.

Figure 1B:
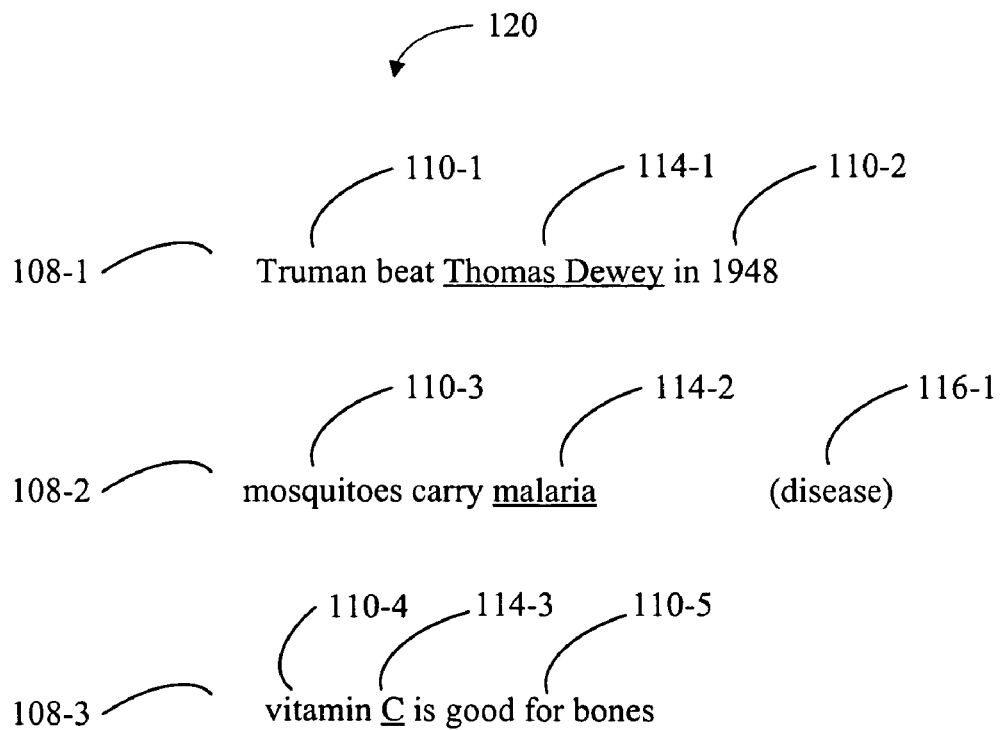
FIG. 1B is a block diagram illustrating an embodiment with several fill-the-blank queries and potential answers.

FIG. 1B illustrates an embodiment 120 with several fill-the-blank queries 108 and potential answers 114. The potential answers 114 are also referred to as identified content or filler text. The embodiments of the method described below, as well as the hardware and systems that may use these methods, allow a search engine to determine a ranked set of information items, such as documents containing content that is most likely to include the potential answers 114. Document locations, corresponding to the documents, may correspond to one or more web sites and/or one or more web pages. The document locations may include one or more uniform resource locators (URLs). The document locations may be on an Intranet and/or the Internet, which is also referred to as the World Wide Web (WWW).

Figure 1C:
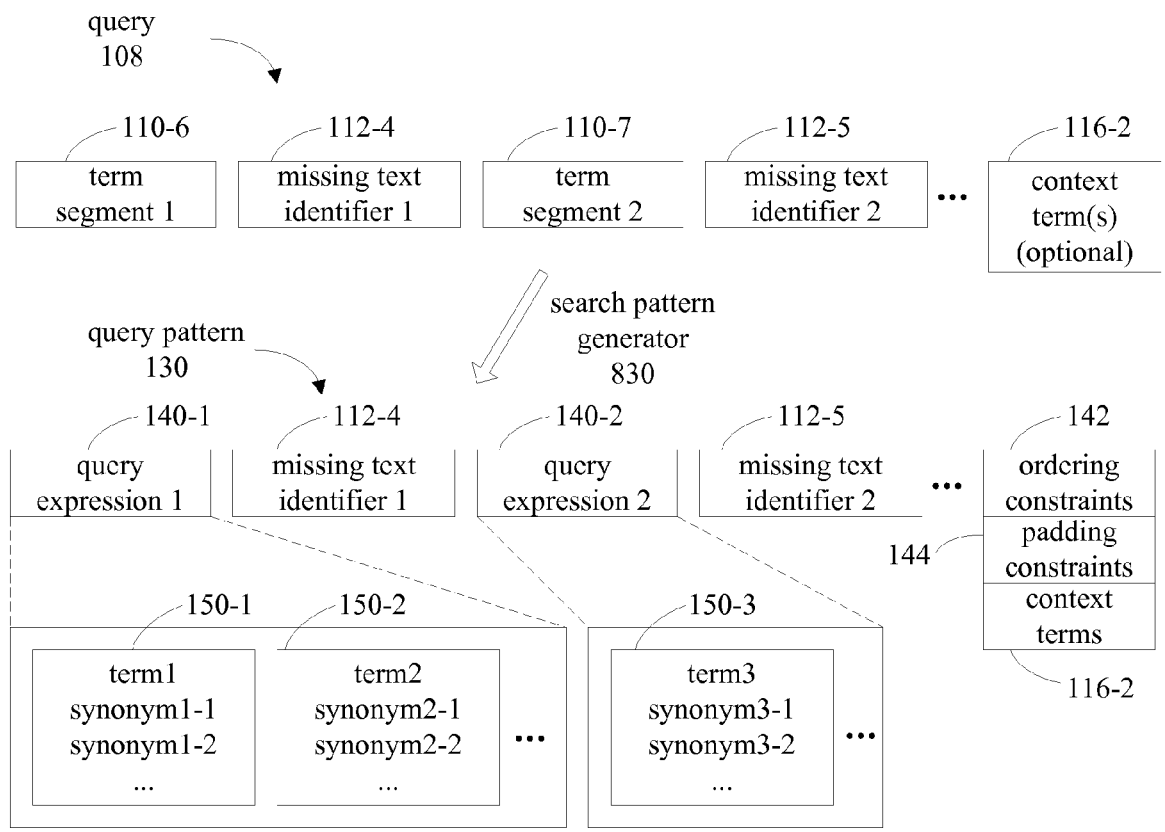
FIG. 1C schematically represents conversion of a fill-the-blank query into a search pattern.

FIG. 1C illustrates the conversion of a fill-the-blank query 108 into a query pattern 130 in accordance with some embodiments of the present invention. The fill the blank query 108 comprises one or more term segments 110 interleaved with one or more missing text identifiers 112. The fill the blank query may optionally include one or more context terms 116, as described above. A search pattern generator 830 (FIG. 8) converts the fill-the-blank query 108 into a query pattern 130 having a query expression 140 for each term segment 110 of the query, one or more missing text identifiers 112, and optionally, one or more ordering constraints 142, one or more padding constraints 144, and the one or more context terms 116. Further, each of the query expressions 140 comprises a set of one or more term expressions 150, one for each of the terms in the corresponding term segment 110. Each term expression 150 comprises a term from the corresponding term segment 110 and zero or more synonyms. In some embodiments, a query expression 140, such as query expression 140-1, may also contain an alternate set of terms herein called a paraphrase. In other embodiments, query patterns 130 may have different components and different structure from that shown in FIG. 1C.

Figure 1D:
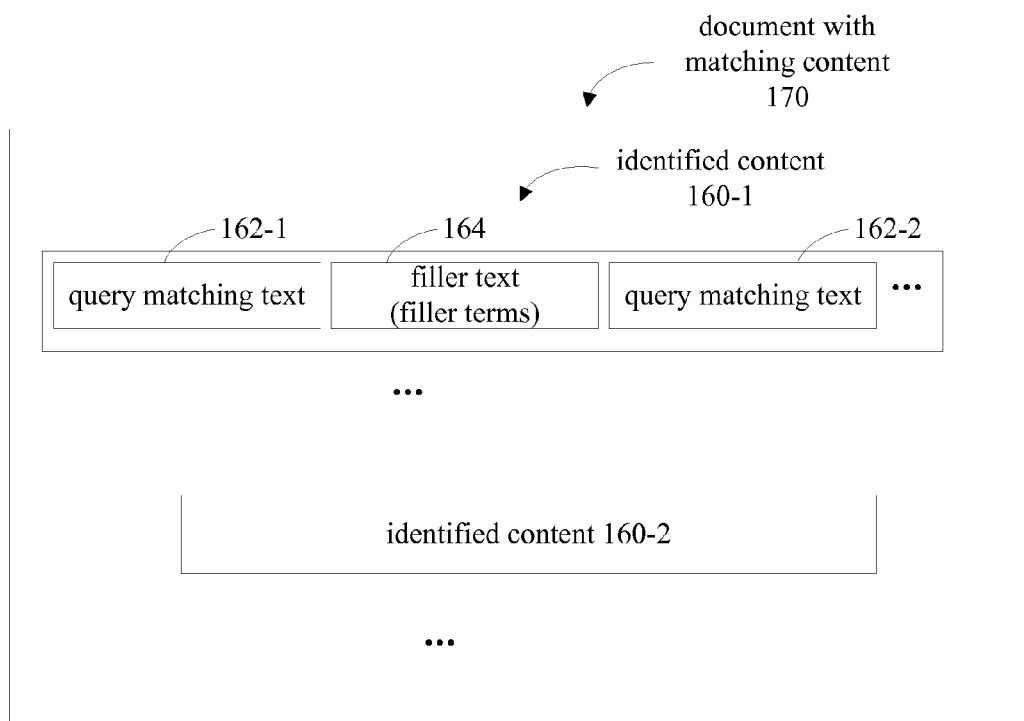
FIG. 1D schematically represents a document containing identified content matching a search pattern.

Referring to FIG. 1D, when there is a match between the query pattern 130 and a document 170, the text that matches the query patter is herein called "identified content" 160. The identified content 160 must include one or more query matching texts 162 that matches each of the query expressions 140 of the query pattern 130. The portion of the identified content 160 corresponding to the one or more missing text identifiers 112 is herein called filler text 164, which comprises one or more filler terms. The filler text 164 of the identified content 160 represents a potential answer to the user's query. In order for the text in a document to match one or the query expressions 140 (of the query pattern 130), the document's text must have a sequence of terms (herein called query matching text 160) that each match a term in a respective term expression 150 of the query expression 140, separated from each other by no more padding words that are allowed by the padding constraints 144, and in an order consistent with the ordering constraints 142.

Figure 2A:
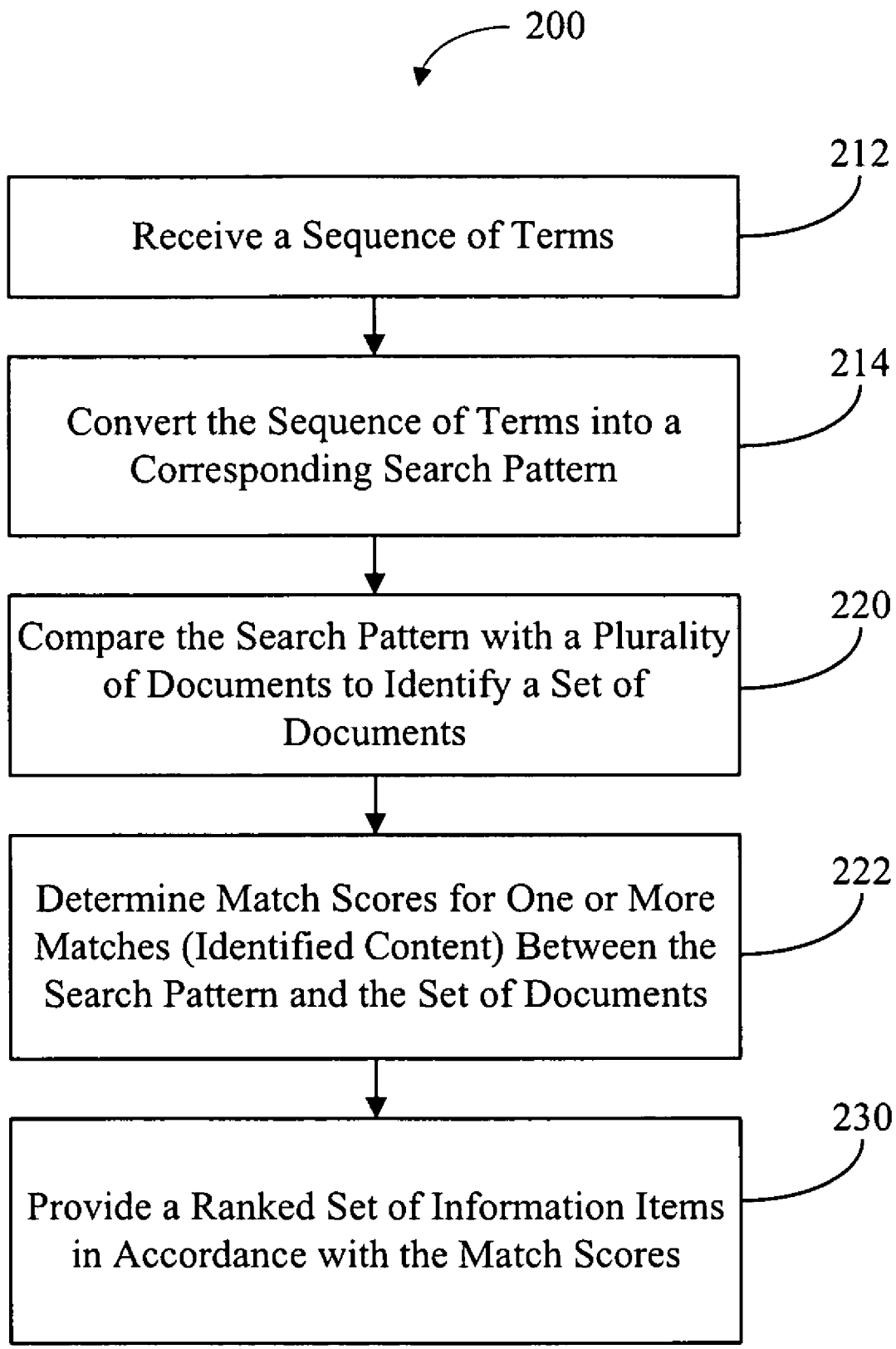
FIG. 2A is a flow diagram illustrating an embodiment of a method of searching for information.

FIG. 2A illustrates an embodiment of a method of searching for information 200. A sequence of terms is received (212). The sequence of terms is converted into a corresponding search pattern (214). The search pattern is compared with a plurality of documents to identify a set of documents (220). Match scores for one or more matches between the search pattern and the set of documents are determined (222), as described in more detail below with reference to FIG. 4. Each match between the search pattern and the set of documents is called identified content. A single document may contain multiple matches, and thus multiple instances of identified content, and a match score is generated for each instance of identified content. A ranked set of information items are provided in accordance with the match scores (230). In other embodiments, the method 200 may include fewer operations or additional operations. In addition, two or more operations may be combined and/or an order of the operations may be changed.

Figure 2B:
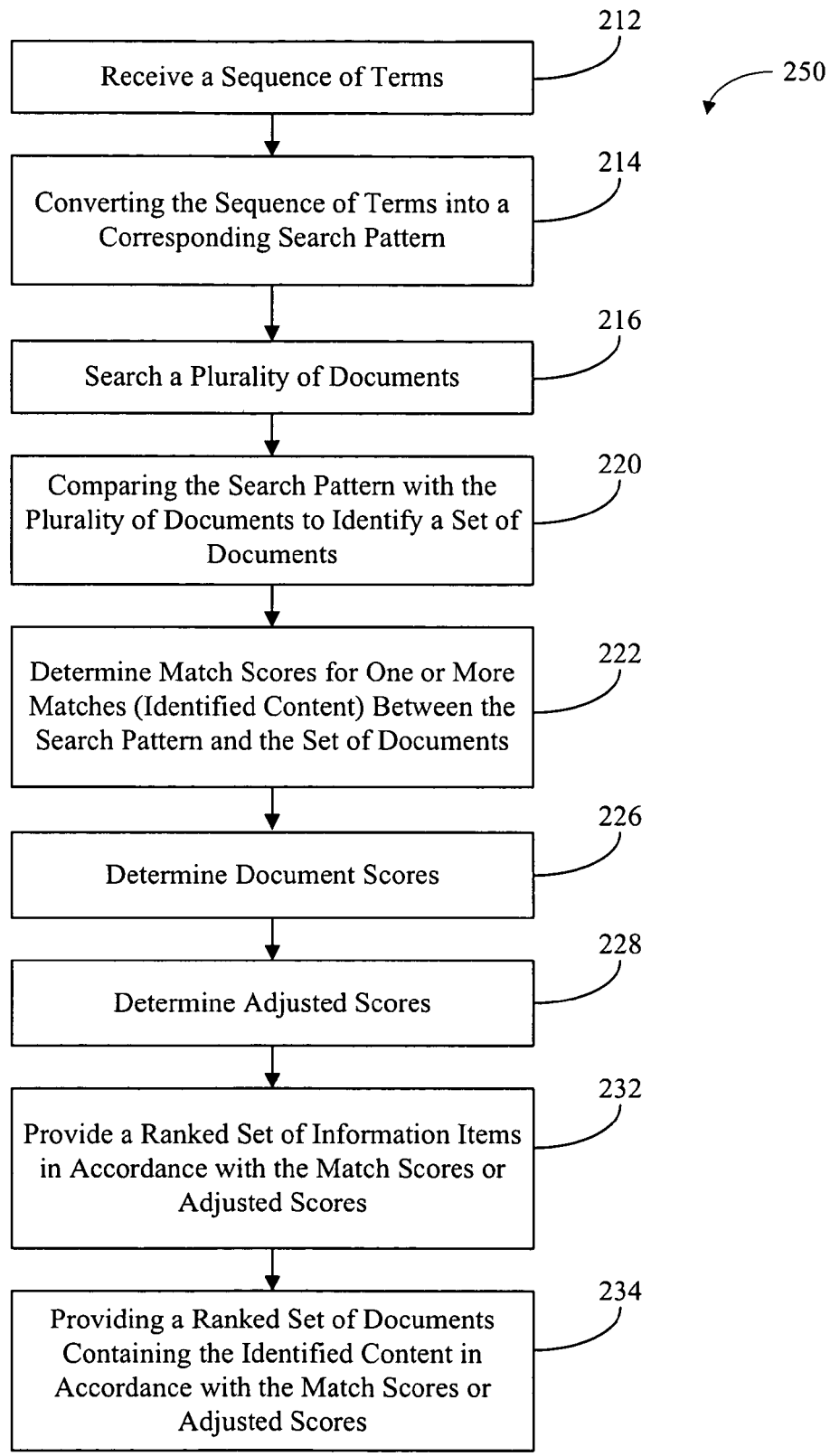
FIG. 2B is a flow diagram illustrating an embodiment of a method of searching for information.

FIG. 2B illustrates an embodiment of a method of searching for information 250. The sequence of terms is received (212). The sequence of terms is converted into a corresponding search pattern (214). A plurality of documents are searched (216). The search pattern is compared with the plurality of documents to identify a set of documents (220). Match scores for one or more matches between the search pattern and the set of documents are determined (222). Document scores are determined (226), as described in more detail below with reference to FIG. 5. Adjusted document scores are determined (228), as described in more detail below with reference to FIG. 6. The ranked set of information items containing the identified content are provided in accordance with the match scores or adjusted document scores (232). A ranked set of documents containing the identified content are provided in accordance with the match scores or adjusted document scores (234). In other embodiments, the method 250 may include fewer operations or additional operations. In addition, two or more operations may be combined and/or an order of the operations may be changed.

Figure 2C:
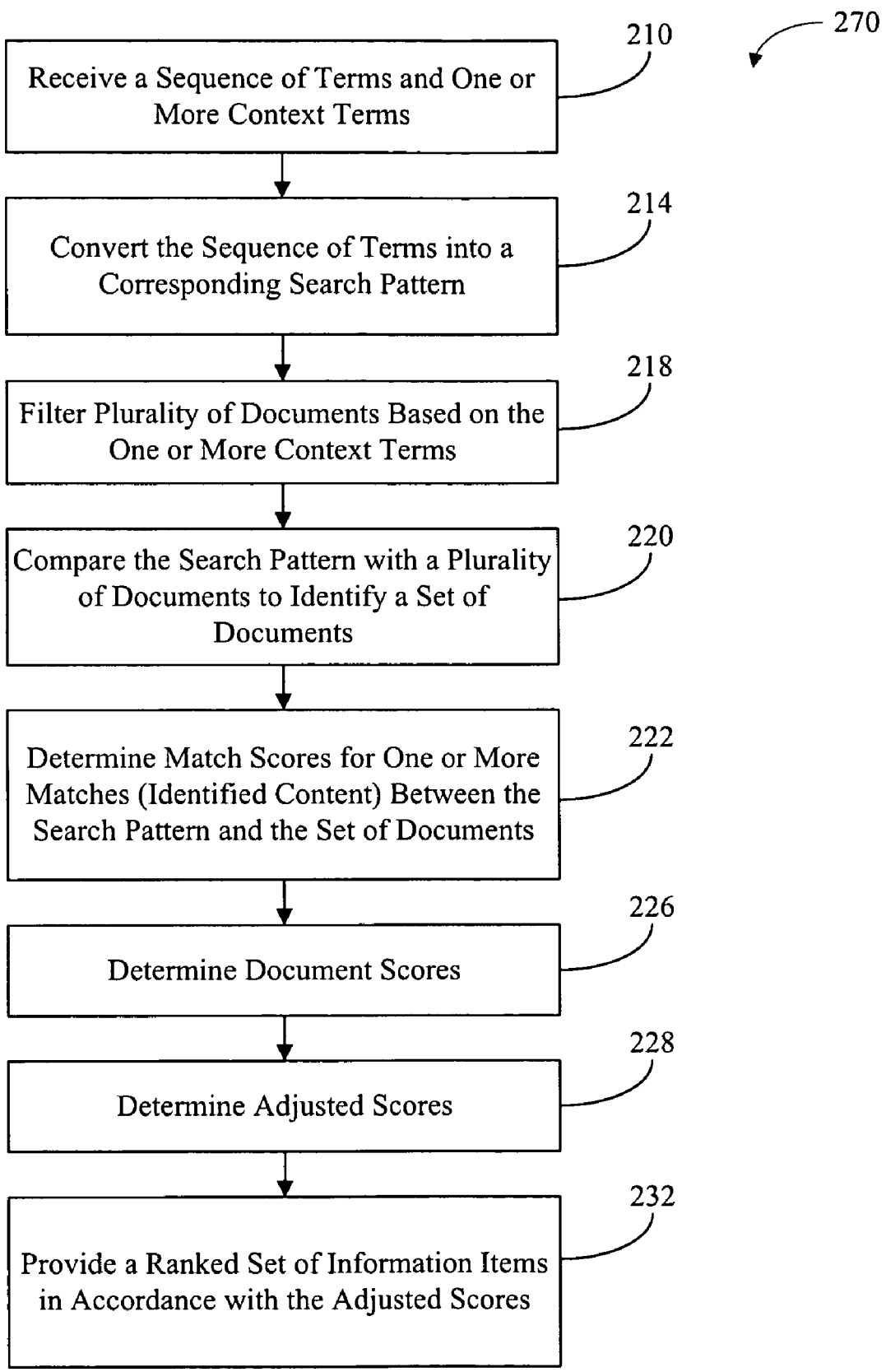
FIG. 2C is a flow diagram illustrating an embodiment of a method of searching for information.

FIG. 2C illustrates another embodiment of a method 270 of searching for information. The sequence of terms and one or more context terms are received (210). The sequence of terms is converted into a corresponding search pattern (214). The plurality of documents are filtered based on the one or more context terms (218). The search pattern is compared with the plurality of documents to identify the set of documents (220). Match scores for one or more matches between the search pattern and the set of documents are determined (222). Document scores are determined (226) and then adjusted document scores are determined (228). The ranked set of information items containing the identified content are provided in accordance with the match scores or adjusted document scores (232). In other embodiments, the method 270 may include fewer operations or additional operations. In addition, two or more operations may be combined and/or an order of the operations may be changed.

Figure 3:
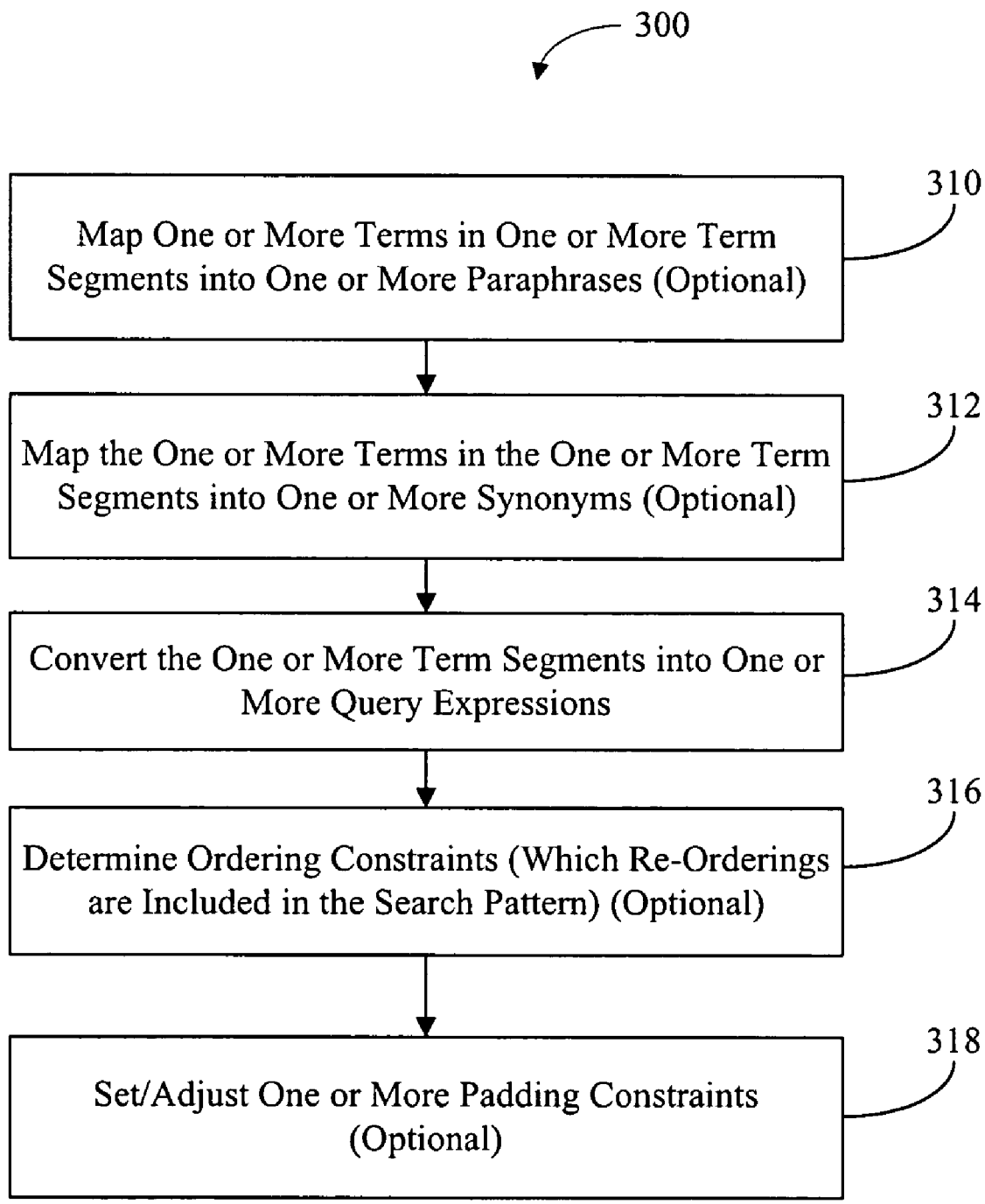
FIG. 3 is a flow diagram illustrating an embodiment of a method of converting a sequence of terms into a search pattern.

FIG. 3 illustrates an embodiment of a method of converting a sequence of terms into a search pattern 300. One or more term segments are optionally mapped into one or more paraphrases (310). For example, the order or at least two terms may be changed. In some embodiments, the order of at least two groups of terms may be changed. One or more term in the one or more term segments are optionally mapped into one or more synonyms (312). The one or more term segments are converted into one or more query expressions (314). Ordering constraints (also called re-ordering constraints) are optionally determined (316). The ordering constraints may specify the one or more orderings of the term segments and/or the query expressions. One or more optional spacing or padding constraints are adjusted (318). The one or more query expressions in the search pattern may, therefore, include one or more paraphrases, one or more synonyms and/or one or more spaces or padding. In other embodiments, the method 300 may include fewer operations or additional operations. In addition, two or more operations may be combined and/or an order of the operations may be changed. In some embodiments, the method 300 may also be iterated a number of times, varying the use of paraphrases, synonyms, re-ordering and/or padding or spacing between query expressions. Alternatively, a generalized search pattern may be generated, including a set of paraphrases, synonyms, re-orderings and/or padding sizes for the query expressions that specify a search pattern. In some embodiments, comparisons between the plurality of documents and the generalized search pattern may include comparisons to a group of search patterns that are performed sequentially or concurrently.

Identification of information items, such as documents in a document database, containing content that corresponds to one or more missing items in the search pattern may utilize one or more operations. As described further below, the one or more operations may be implemented at one or more locations and/or at different levels in the search engine infrastructure.

One operation is the determination of match scores for documents using textual pattern matching techniques. Documents having one or matches with one or more query expressions in the search pattern may be identified and a match score may be determined for each match in a respective document. Matches (candidate content) may be constrained by limiting the number of padding words in the candidate content and/or by excluding content that crosses sentence boundaries or punctuation marks.

For a respective match, the length of the content in the respective document that may correspond to the one or more missing terms may be determined using a content score or uniqueness metric. A uniqueness metric or content score may represent an estimate of the amount of information or a value of the information represented by a candidate term in the content corresponding to a missing term. One possible content score for a candidate term in the respective content is an inverse document frequency (IDF). The IDF is an inverse of a number documents in the document database in which the candidate term appears. As such, uncommon terms have a larger IDF. Terms having large IDF values are presumed to be more meaningful than terms having smaller IDF values. While this document will sometimes refer to operations performed using IDF as the content score or uniqueness metric, it is to be understood that in other embodiments a content score or uniqueness metric other than IDF may be used. In some embodiments, for instance, a dictionary of content scores may be used to assign a content score to each term. Terms not found in the dictionary may be assigned a default content score or may be assigned a content score in accordance with a predefined assignment algorithm.

As the length (i.e., number of terms) of the respective content is increased, a sudden decrease in the IDF (or, more generally, content score) of the last term of the respective content may signify that the end of a phrase or a sentence has been reached, thereby indicating that the content should be truncated. In an exemplary embodiment, if the IDF of a next candidate term for inclusion in the identified content has an IDF that is less than N times (e.g., 0.5, or more generally a value between 0.3 and 0.6) the IDF of the previous term already included in the identified content. For instance, if the IDF decreases by a factor of two or more, the candidate term is excluded from the identified content and the identified content is truncated at the previous term. In some embodiments, the IDF analysis for truncating the identified content skips over predefined "noise words" or "stop terms" in the respective content so long as at least one later term is included in the identified content. For example, all occurrences of the word "the" in the respective content are ignored, and are included in identified content so long as the word "the" is followed by at least one term that is included in the identified content. In other embodiments, the length of the identified content may also be limited to a pre-determined maximum length value. For instance, a matching content string may be truncated after eight words or terms, or upon reaching a term that would cause a decrease in IDF (of the last term in the content) by a factor of two or more, whichever occurs first.

A respective match score for the respective identified content in the respective document may be based on a content score for the respective identified content, such as one or more IDF values for terms in the respective content, and a content score for padding (if any) between one or more query terms in the content. The content score for the padding, such as the IDF of the padding, may be a subtractive factor in the respective match score. The respective match score may also be based on weights of one or more synonyms in the search pattern that match terms in the respective content. Synonym weights represent an estimate of the similarity between a term and its synonym. In some embodiments, the synonym weight of a query term itself is 1, while the synonym weights of its synonyms (if any) are values between 0 and 1. The respective match score may be a weighted summation of the content score for the respective content, the content score for the padding, if any, between the one or more query terms in the respective content and the weights of the one or more synonyms in the respective content. For example:

$$\text{match\_score} = \frac{\alpha}{n_1} \cdot \sum_i c(\text{filler}_i) + \frac{\beta}{n_2} \cdot \sum_j s(q_j, w_j) \cdot c(w_j) - \frac{\gamma}{n_3} \cdot \sum_k c(p_k)$$

where $n_1$ is the number of fillers in the match, $c(\ )$ is the content score of the respective argument, $\text{filler}_i$ is a filler term in the match, $1 \leq i \leq n_1$, $q_j$ is a query term, $w_j$ is a synonym of $q_j$ with weight $s(q_j, w_j)$, $n_2$ is the number of query terms or synonyms in the match, $1 \leq j \leq n_2$, $p_k$ is a padding term in the match, $n_3$ is the number of padding terms in the match, $1 \leq k \leq n_3$, and $\alpha$, $\beta$ and $\gamma$ are positive weighting terms or coefficients. In some embodiments, match scores for identified content may be normalized by dividing each match score component (as illustrated in the formula above) by the number of terms contributing to that component. Normalizing the match scores in this way may be used to keep the match scores in a predefined dynamic range. In some embodiments, match scores may include a number of punctuations (with a negative scaling weight) and, for languages where it is relevant, a ratio of terms in the identified content that are capitalized.

Figure 4:
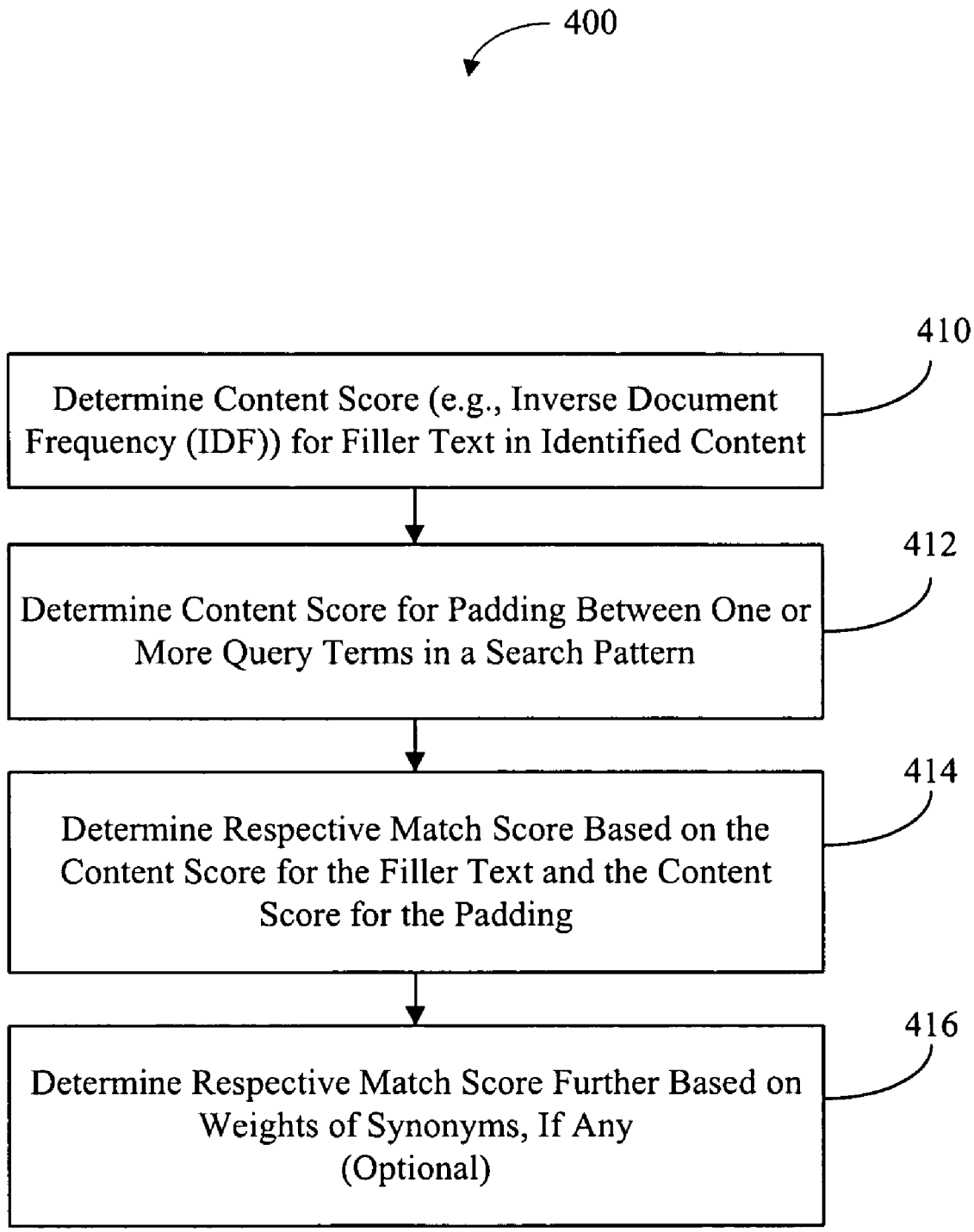
FIG. 4 is a flow diagram illustrating an embodiment of a method of determining a match score.

FIG. 4 illustrates an embodiment of a method of determining a match score 400. A content score for identified content is determined (410). In some embodiments, the content score for the identified comment is a summation of content scores for one or more of the terms in the identified content (i.e., content corresponding to the one or more missing term in the search pattern). The content scores of the individual terms may be based on inverse document frequency (IDF) values for those terms. In some embodiments, the number of terms whose content scores are included in the content score for the identified content may be limited to a predefined maximum number, such as 1, 2, 3 or 4, of the highest content score terms in the identified content.

The content score for padding, if any, between query terms in a search pattern is determined (412). A respective match score based on the content score for the identified content and the content score for the padding is determined (414). The respective match score is further optionally based on the weights of synonyms, if any, found in the respective content is determined (416). In other embodiments, the method 400 may include fewer operations or additional operations. In addition, two or more of the aforementioned operations may be combined and/or an order of the operations may be changed.

Another possible operation in the determination of the content in the information items is the determination of a document score. Document scores may be determined for the set of documents in the document database containing one or more matches with the search pattern. A respective document score for the respective document may be based on the highest match score in the respective document and a total number of matches between the search pattern and the respective document. Such an approach gives more weight to documents having larger numbers of instances of content that matches the search pattern than to documents having lesser amounts of content that matches the search pattern. The respective document score may also be based on a quality of document metric, such as a page rank generated separately by the search engine. For example, the page rank may be based on the number of links to the respective document, such as a web page or a web site, in other documents. In an exemplary embodiment, the respective document score is a weighted summation of the highest match score in the respective document, the total number of matches between the search pattern and the respective document and the quality of document metric.

Figure 5:
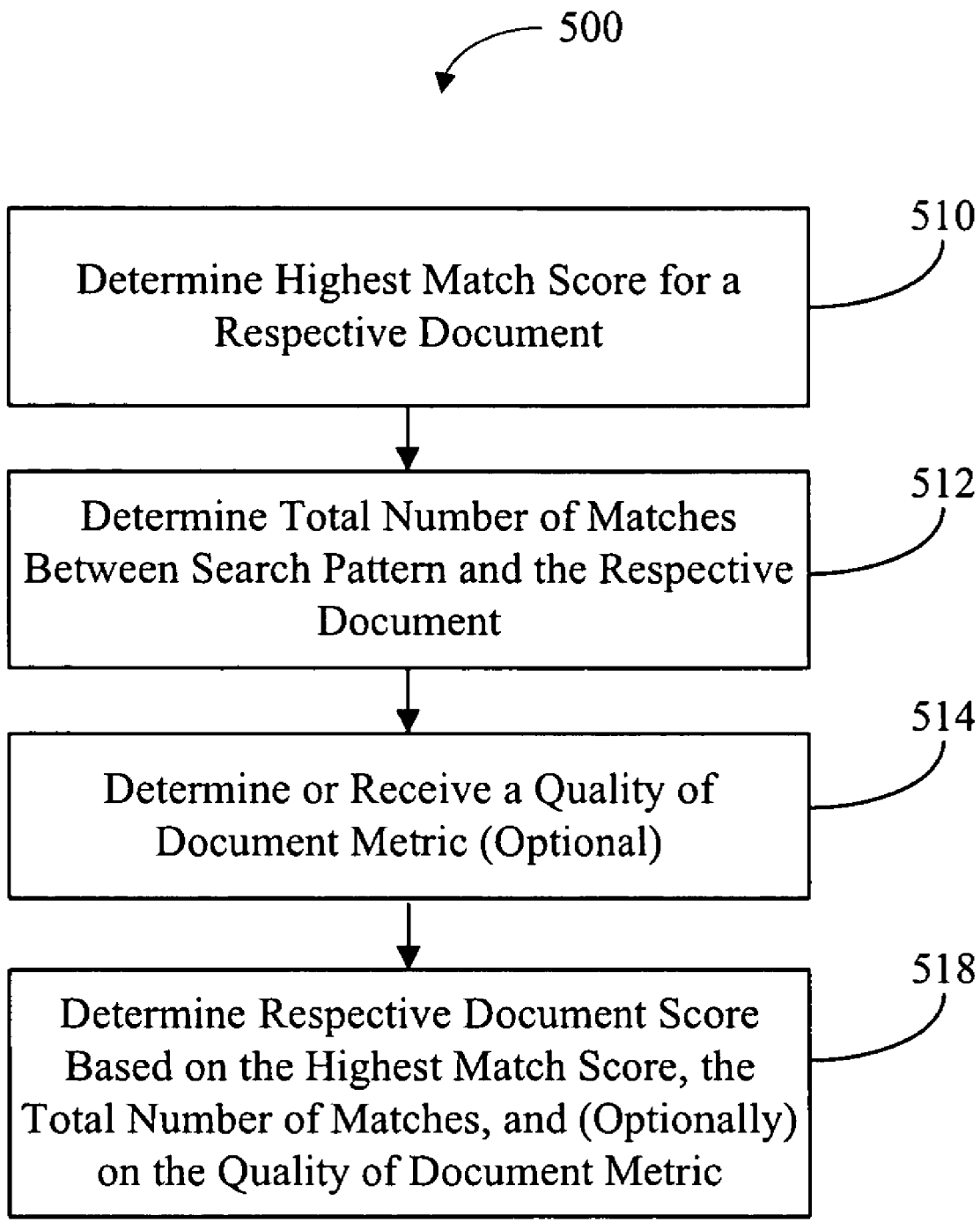
FIG. 5 is a flow diagram illustrating an embodiment of a method of determining a document score.

FIG. 5 illustrates an embodiment of a method 500 of determining a document score. A highest match score for a respective document is determined (510). A total number of matches between the search pattern and the respective document is also determined (512). A quality of document metric may be optionally determined or received (514). A respective document score is determined based on the highest match score and the total number of matches (518). The respective document score may, optionally, also be based on the quality of document metric (518). In other embodiments, the method 500 may include fewer operations or additional operations. In addition, two or more operations may be combined and/or an order of the operations may be changed.

Figure 6:
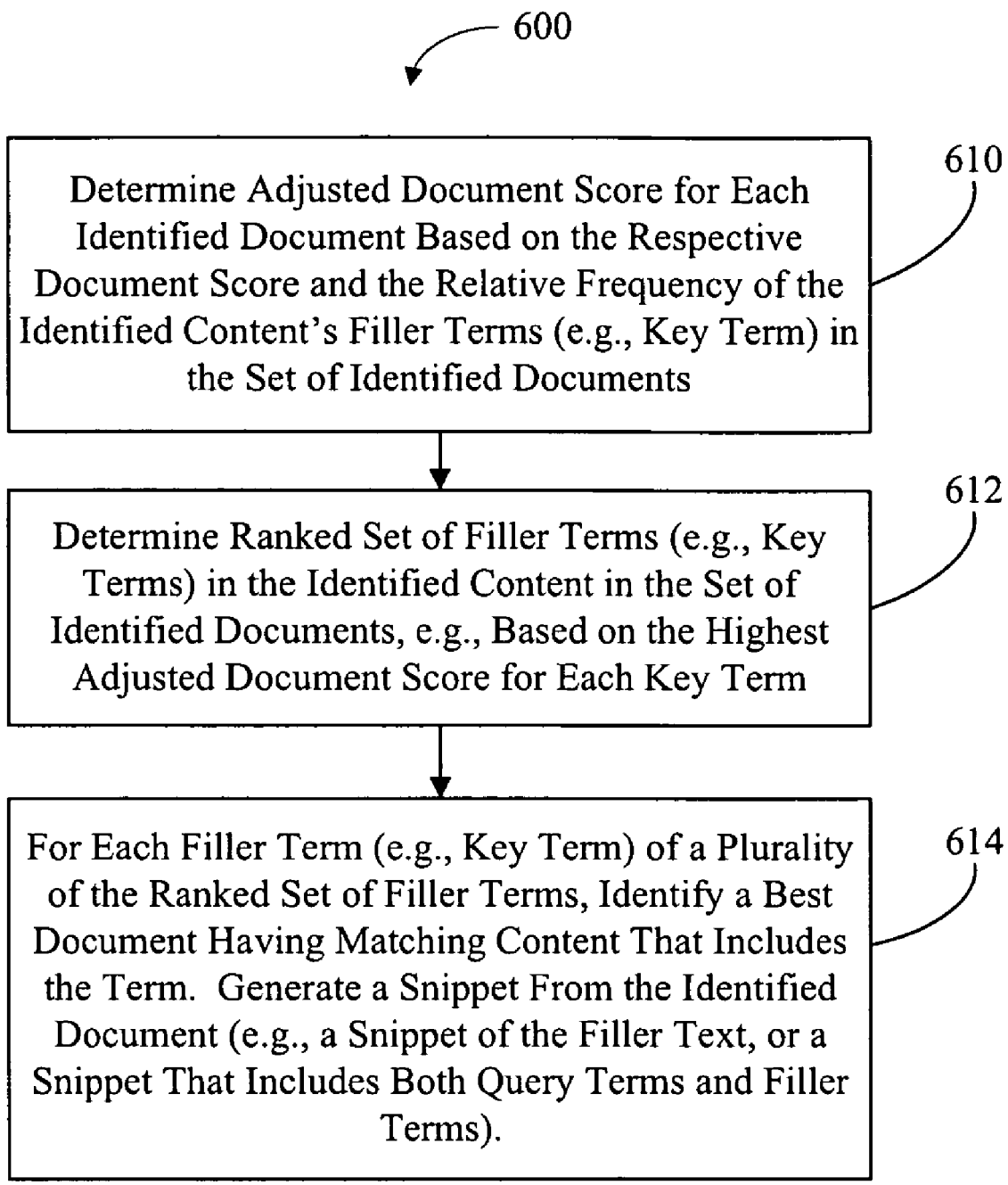
FIG. 6 is a flow diagram illustrating an embodiment of a method of determining an adjusted document score.

Referring to FIG. 6, yet another possible operation in the determination of the content in the information items is the determination of an adjusted document score. The adjusted document score for a particular document may be based on (A) the relative frequency of document's identified content (compared with the frequency of other identified content in the set of identified documents) and (B) the document score for the document in which the respective content is found (610). The relative frequency of a document's identified content may be defined with respect to the "key term" of the identified content, where the key term is a filler term (of the identified content of this particular document) having the highest content score (e.g., highest IDF). In some embodiments, the relative frequency of a particular document's identified content is the ratio of the number of documents having the same key term to the number of documents in the set of identified documents having one or more matches with the search pattern. For instance, if the key term of a document is "pencil" and 20 documents out of 400 have the same key term, then the relative frequency of the document's identified content is 0.05. In another embodiment, the relative frequency of a particular document's identified content, having a particular key term, is the ratio of the number of documents having this particular term among their filler terms to the number of documents in the set of identified documents having one or more matches with the search pattern. For instance, if the key of a document is "pencil" and 20 documents out of 400 have the same key term, but the term "pencil" is found among the filler terms of 120 of the documents, then the relative frequency of the document's identified content is 0.3. In another embodiment, the relative frequency is computed as above but further multiplied by the content score of the key term. In another embodiment, the relative frequency of the identified content is taken to be the average of relative frequencies of each filler term in the identified content (as opposed to just the filler term with the highest content score). In some embodiments, the adjusted document score for each identified document is obtained by multiplying the identified document's document score by the relative frequency of the document's identified content.

Once the adjusted document scores have been computed (610), the key terms in the filler text of all the identified documents can be ranked in accordance with the highest adjusted document score for each key term (612). In other words, for each filler term that is the key term of at least one document, the method identifies the highest adjusted document score of the documents sharing that key term, and then the key terms are ranked or ordered in accordance with those adjusted document scores. Finally, an ordered set of information items is generated based on the ordered set of key terms (614). The information item corresponding to each key term may be represented by the filler text of the corresponding document having the highest adjusted document score, or by a snippet of the filler text, or by a snippet of the identified text that includes the filler text. In some embodiments, each information item can additionally identify the key term of the filler text associated with the information item and the relative frequency of the key term. For instance, an information may include a snippet of the query and filler text (e.g., "mosquitoes carry West Nile Virus"), a URL of a document corresponding to the snippet (e.g., http://www.mcdef.org/wnileinf.-htm), the key term of the filler text and a relative frequency of the key term (e.g., "Nile [35%]"). The relative frequency of the key term may be expressed as a percentage, to make it easily understood by ordinary users. In other embodiments, a set of information items may be selected based on the adjusted document scores using other ordering or selecting methods.

Figure 7:
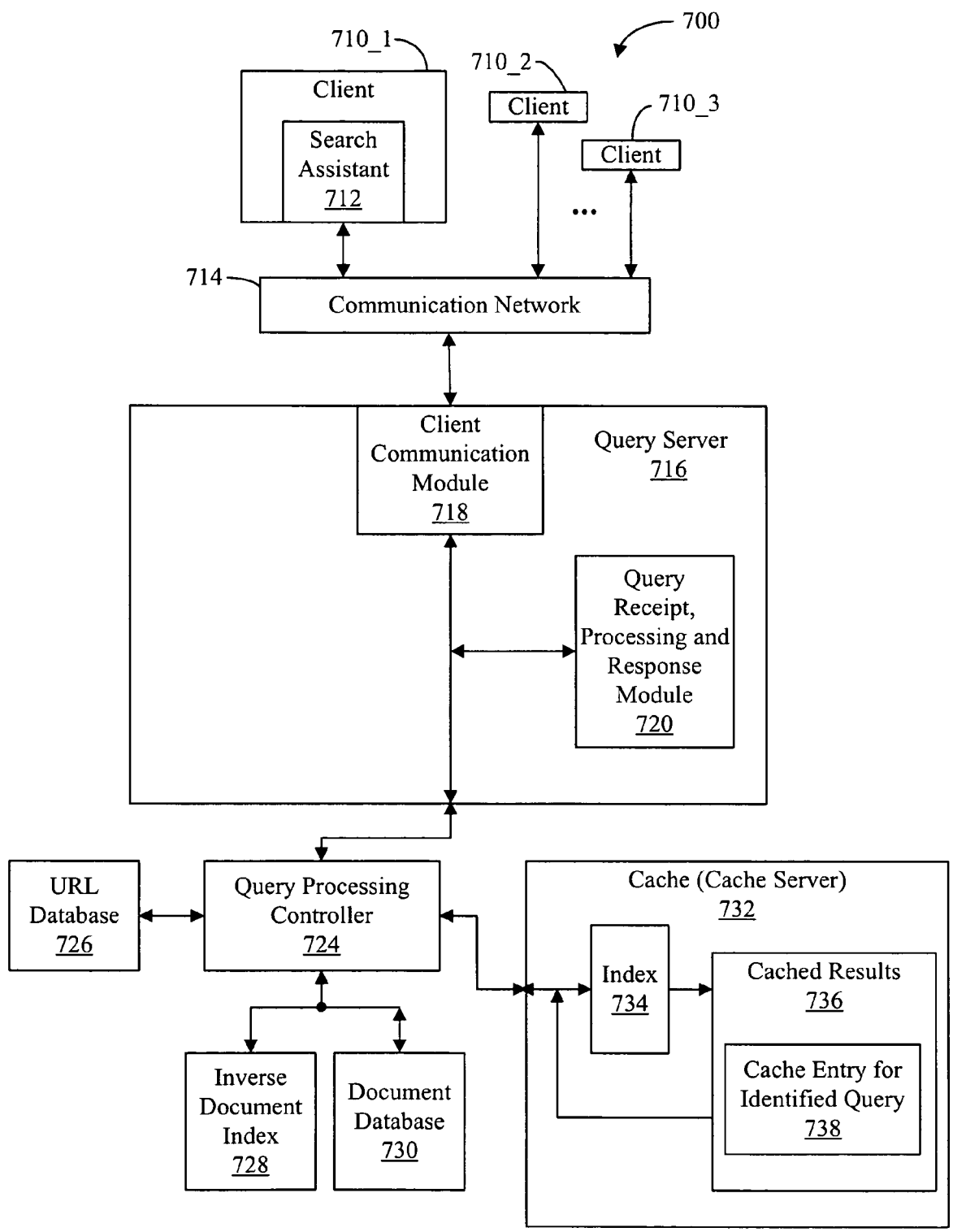
FIG. 7 is a block diagram illustrating an embodiment of a search engine system.

Attention is now given to hardware and systems that may utilize and/or implement the improved method of searching for information in the embodiments 200, 250 and 270 discussed above. FIG. 7 illustrates an embodiment of a search engine system 700 that generates search results in response to search queries from one or more clients 710. Each client 710 may have a search assistant, such as search assistant 712. It should be appreciated that the layout of the search engine system 700 is merely exemplary and may take on any other suitable layout or configuration. The search engine system 700 is used to search an index of documents, such as billions of web-pages or other documents indexed by modern search engines.

Note that the search engine system 700 can be used as an Internet search engine, for locating documents on the WWW and/or as an Intranet search engine, for locating documents stored on servers or other hosts within an Intranet. In addition, the methodology described herein is applicable to implementations where only portions of documents, such as titles and abstracts, are stored in the database of the search engine system 700.

The search engine system 700 may include multiple data centers each housing a backend. The data centers are generally widely dispersed from one another, such as across the continental United States. Search queries submitted by users at one of the clients 710 to the search engine system 700 are routed to an appropriate backend as part of the Domain Name System (DNS), based on current load, geographic locality and/or whether that data center is operating.

Each backend preferably includes multiple query servers, such as query server 716, coupled to a communications network 714 via a client communication module 718. The communications network 714 may be the Internet, but may also be any local area network (LAN) and/or wide area network (WAN). In some embodiments, each query server 716 is a Web server that receives search query requests and delivers search results in the form of web pages via HTTP, XML or similar protocols. Alternatively, if the query server 716 is used within a LAN, i.e., internally and not by the public, it may be an Intranet server. In essence, the query servers, such as query server 716, are configured to control the search process, including searching a document index, analyzing and formatting the search results.

Each backend also includes a query receipt, processing and response module 720 for managing the processing of search queries by multiple query processing controllers, such as query processing controller 724, that are coupled to the query server 716. Each query processing controller 724 may be coupled to a cache 732, a URL database 726, an inverse document index 728 and a document database 730. Each query processing controller 724 is configured to receive requests from one of the query servers, such as the query server 716, and transmit the requests to the cache 732, the URL database 726, the inverse document index 728 and the document database 730.

The cache 732 is used to increase search efficiency by temporarily storing previously located search results. The efficiency and cost of performing a search is dependent on a number of factors, such as the various combinations of terms and/or keywords used in the search query, the length of time spent on the search and the number of documents indexed. The average response time and cost of a search is lowered by storing the search results 736 of previously requested search queries in the temporary storage or cache 732 of the search engine system 700. One of the benefits of keeping a cache of commonly searched information is that it ensures a fast response to subsequent search queries for the same information, as it takes less time to retrieve the information from local memory. Another benefit of caching commonly searched information is to reduce the cost of servicing multiple search queries requesting the same information. When the result of a search is cached, there is no need to perform another search of the document database 730, which may be distributed over multiple disks and/or memory arrays on multiple remote computer servers. Retrieving such information from the multiple disks and memory arrays in multiple remote computer servers requires significantly more time and resources than retrieving the information from the cache 732. Instead, an index 734 contains a pointer to a cache entry corresponding to a current search query 738.

The search rank values for the documents in the search results are conveyed to the query processing controller 724 and/or the query server 716, and are used to construct an ordered search result list. Once the query processing controller 724 constructs the ordered search result list, the query processing controller 724 may transmit to the document database 730 a request for snippets of an appropriate subset of the documents in the ordered search list. For example, the query processing controller 724 may request snippets for the first fifteen or so of the documents in the ordered search result list. The document database 730 constructs snippets based on the search query, and returns the snippets to the query processing controller 724. The query processing controller 724 then returns a list of located documents and snippets back to the query server 716. In some embodiments, the snippets are stored in the cache server 732 along with the cached results 736. As a result, in these embodiments the query processing controller 724 may only request snippets for documents, if any, for which it is unable to obtain valid cached snippets from the cache server 732.

In the context of the method of searching for information, a fill-the-blanks query received by the query server 716 may be processed by the query, receipt, processing and response module 720 to generate the search pattern. One or more query processing controllers 724 may identify documents with possible matches using the inverse document index 728 and/or the cache 732, and use the document database 730 and/or the cache 732 to perform the operations of determining the match scores, determining the document scores and/or determining the final scores. The determining of the match scores, the relative frequency of the match key for the respective document and/or the document scores may be performed at a lower level in the hierarchy of the search engine 700, such as in the document database 730, and/or in multiple partitions in the document database 730. The determining of the match scores and/or the document scores may also be performed on servers located at multiple locations in the search engine 700.

Figure 8:
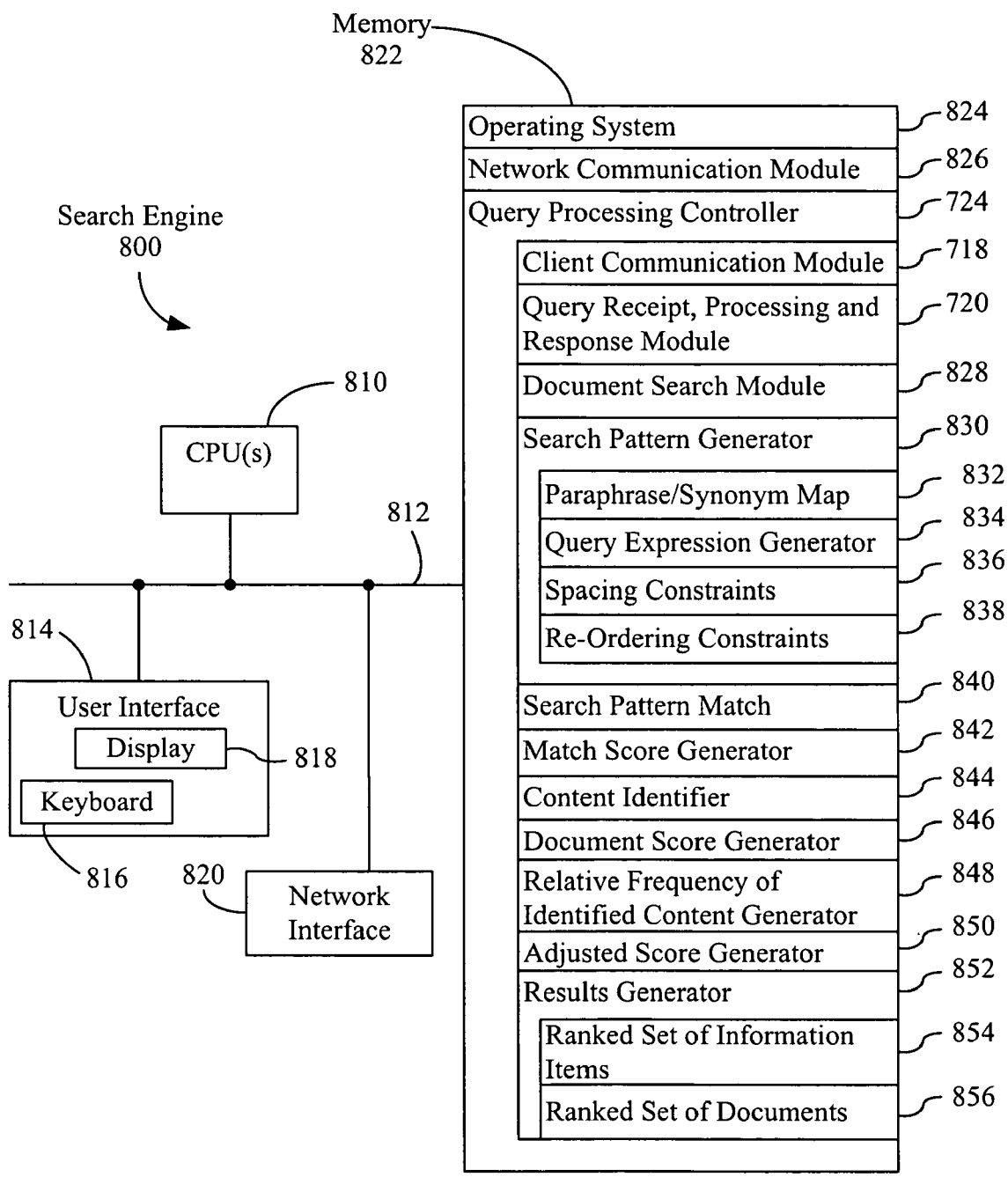
FIG. 8 is a block diagram illustrating an embodiment of a search engine.

FIG. 8 is block diagram illustrating an embodiment of a search engine 800. The search engine 800 may include at least one data processor or central processing unit (CPU) 810, one or more optional user interfaces 814, a communications or network interface 820 for communicating with other computers, servers and/or clients, a memory 822 and one or more signal lines 812 for coupling these components to one another. The user interface 814 may have one or more keyboards 816 and/or displays 818. The one or more signal lines 812 may constitute one or more communications busses.

The memory 822 may include high-speed random access memory and/or non-volatile memory, such as one or more magnetic disk storage devices. The memory 822 may store an operating system 824, such as LINUX, UNIX or WINDOWS, that includes procedures (or a set of instructions) for handling basic system services and for performing hardware dependent tasks. The memory 822 may also store communication procedures (or a set of instructions) in a network communication module 826. The communication procedures are used for communicating with clients, such as the clients 710 (FIG. 7), and with other servers and computers in the search engine 800.

The memory 822 may also store the query processing controller 724 (or a set of instructions). The query processing controller 724 may include the following elements, or a subset or superset of such elements: the client communication module 718, the query receipt, processing and response module 720, document search module 828, a search pattern generator 830, a search pattern match 840, a match score generator 842, content identifier 844, a document score generator 846, a relative frequency of identified content generator 848, an adjusted score generator 850 and a results generator 852. The search pattern generator 830 may include a paraphrase/synonym map 832, a query expression generator 834, spacing constraints 836 and re-ordering constraints 838. The results generator 852 may include ranked set of information items 854 and a ranked set of documents 856. The results generator 852 may provide the user with a ranking of the information items containing the identified content.

Although FIG. 8 (like FIG. 7) shows search engine 800 as a number of discrete items, FIG. 8 is intended more as a functional description of the various features which may be present in a search engine system rather than as a structural schematic of the embodiments described herein. In practice, and as recognized by those of ordinary skill in the art, the functions of the search engine 800 may be distributed over a large number of servers or computers, with various groups of the servers performing particular subsets of those functions. Items shown separately in FIG. 8 could be combined and some items could be separated. For example, some items shown separately in FIG. 8 could be implemented on single servers and single items could be implemented by one or more servers. The actual number of servers in a search engine system and how features, such as the query processing controller 724, are allocated among them will vary from one implementation to another, and may depend in part on the amount of information stored by the system and/or the amount data traffic that the system must handle during peak usage periods as well as during average usage periods.

Figure 9:
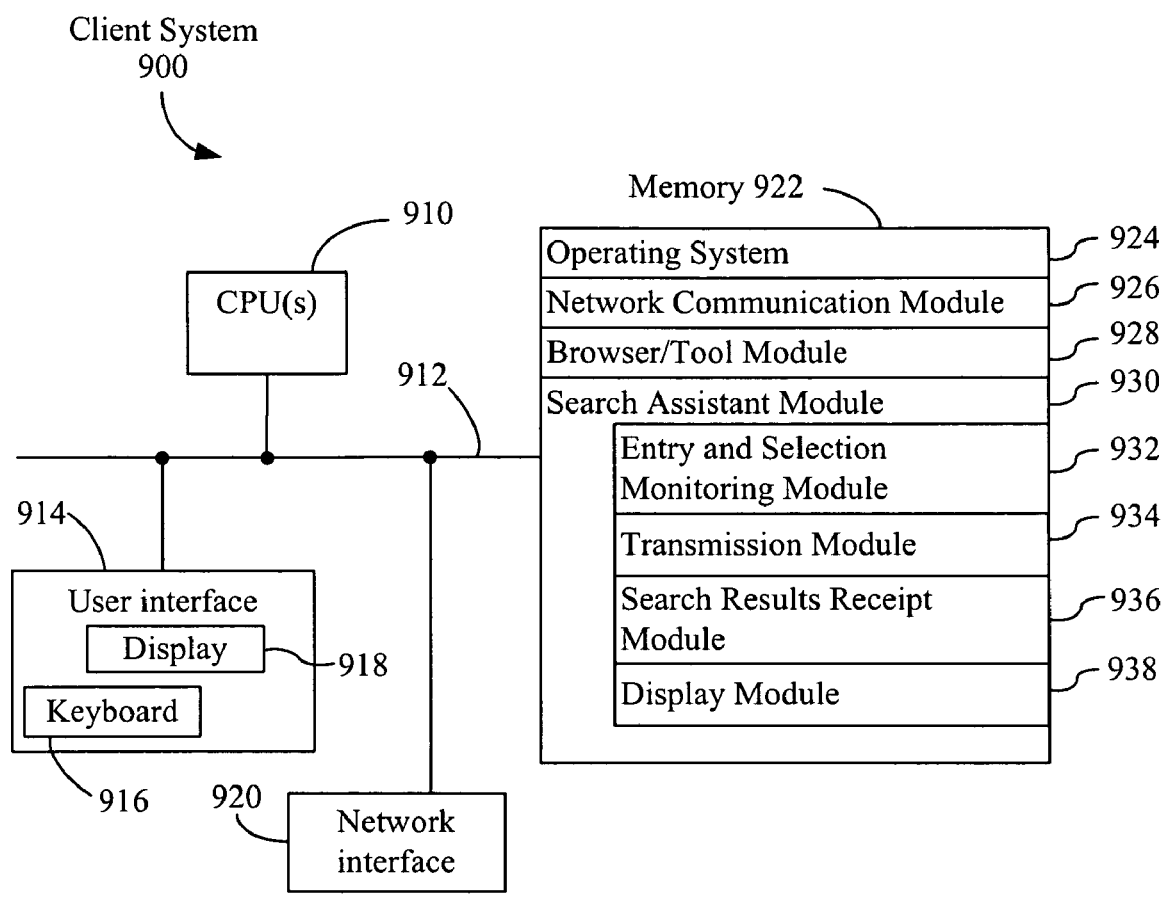
FIG. 9 is a block diagram illustrating an embodiment of a client system.

FIG. 9 illustrates a block diagram of an embodiment of a client system 900, such as one of the clients 710 (FIG. 7). The client system 900 may include at least one data processor or central processing unit (CPU) 910, one or more optional user interfaces 914, a communications or network interface 920 for communicating with other computers, servers and/or clients, a memory 922 and one or more signal lines 912 for coupling these components to one another. The user interface 914 may have one or more keyboards 916 and/or one or more displays 918. The one or more signal lines 912 may constitute one or more communications busses.

The memory 922 may include high-speed random access memory and/or non-volatile memory, such as one or more magnetic disk storage devices. The memory 922 may store an operating system 924, such as LINUX, UNIX or WINDOWS, that includes procedures (or a set of instructions) for handling basic system services and for performing hardware dependent tasks. The memory 922 may also store communication procedures (or a set of instructions) in a network communication module 926. The communication procedures may be used for communicating with a search engine.

The memory may also include a browser or browser tool module 928 (or a set of instructions) and the search assistant module 930 (or a set of instructions). The search assistant module 930 may include an entry and selection monitoring module 932 for monitoring user input, a transmission module 934 for sending a search query, a search results receipt module 936 for receiving search results and a display module 938 for displaying search results, such as a ranking of information items containing identified content corresponding to a fill-the-blank query. In embodiments where the client system 900 is coupled to a local server computer, one or more of the modules and/or applications in the memory 922 may be stored in a server computer at a different location than the user.

Each of the above identified modules and applications corresponds to a set of instructions for performing one or more functions described above. These modules (i.e., sets of instructions) need not be implemented as separate software programs, procedures or modules. The various modules and sub-modules may be rearranged and/or combined. The memory 922 may include additional modules and/or sub-modules, or fewer modules and/or sub-modules. For example, the search assistant module 930 may be integrated into the browser/tool module 928. The memory 922, therefore, may include a subset or a superset of the above identified modules and/or sub-modules.

Figure 10:
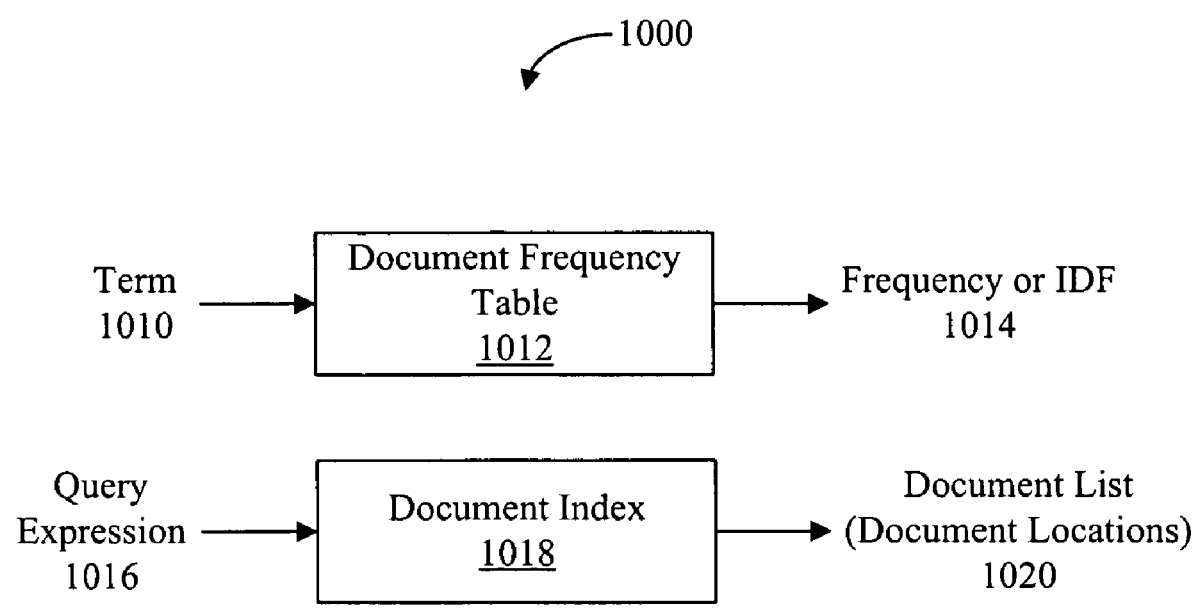
FIG. 10 is a block diagram illustrating an embodiment of mappings used in a method of searching for information.

FIG. 10 illustrates an embodiment 1000 of mappings used in a method of searching for information. A document frequency table 1012 may be used to map from a term 1010, such as a term in respective identified content in the respective document in the set of documents, into a frequency or IDF 1014. A document index 1018, generated using the embodiments of the method of searching for information, may be used to map a query expression 1016 based on a fill-the-blank query into a document list or document locations 1020.

Illustrations of several embodiments of data structures that may be used by the search engine in the method of searching for information are now provided. In some embodiments, two or more of these data structures may be combined into a single data structure.

Figure 11:
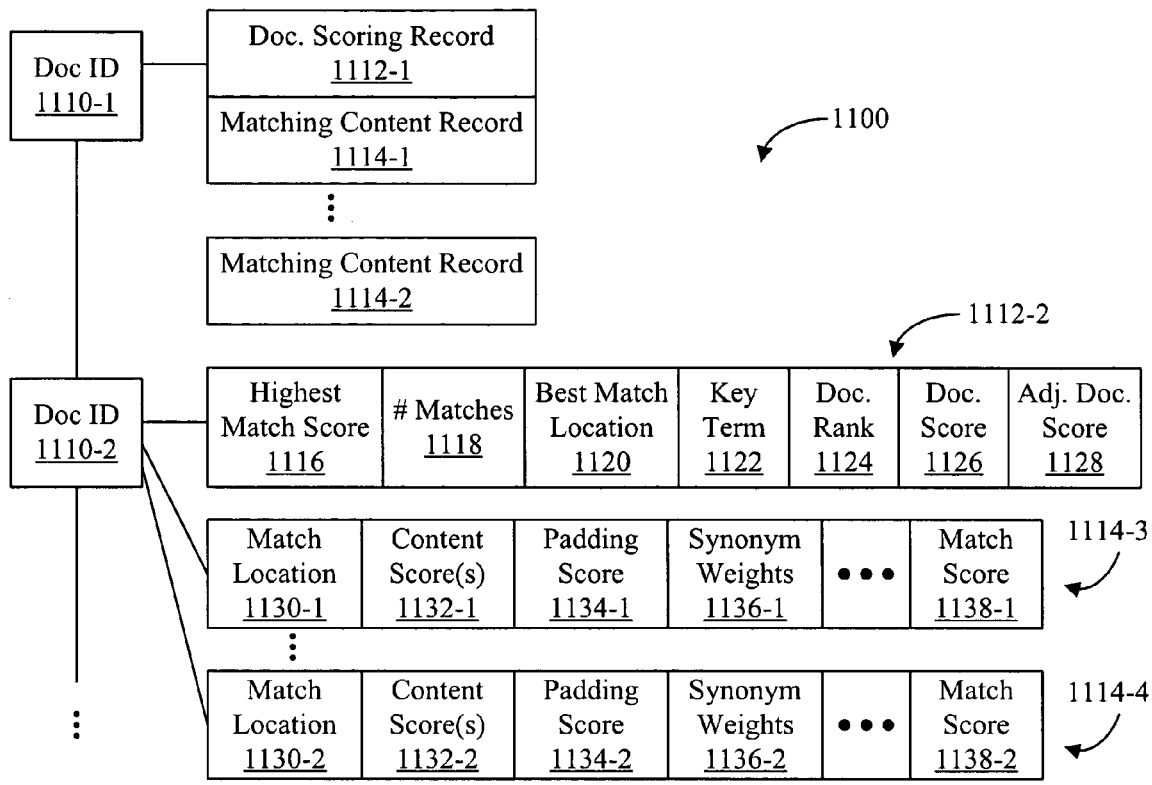
FIG. 11 is a block diagram illustrating an embodiment of a match score data structure.

FIG. 11 is a block diagram illustrating an embodiment of a match score data structure 1100. The match score data structure 1100 includes a plurality of document identifier records 1110. Each document identifier record 1110 includes a document scoring record 1112 and one or more matching content records 1114. Each document scoring record 1112 may include a highest match score 1116, a number of matches 1118, a best match location 1120, a key term 1122, a document rank 1124, a document score 1126 and an adjusted document score 1128. Each matching content record 1114 may include a match location 1130, content scores 1132, padding score 1134, synonym weights 1136 and a match score 1138.

Figure 12:
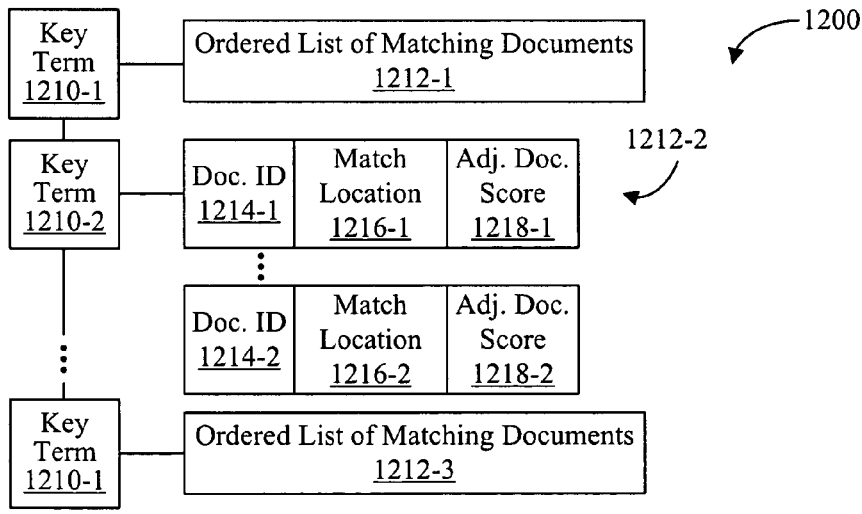
FIG. 12 is a block diagram illustrating an embodiment of a document score data structure.

FIG. 12 is a block diagram illustrating an embodiment of a document score data structure 1200. The document score data structure 1200 includes a plurality of key term records 1210. Each key term record 1210 includes one or more ordered lists of matching documents 1212. Each ordered list of matching documents 1212 may include a document identifier 1214, a match location 1216 and an adjusted document score 1218.

Figure 13:
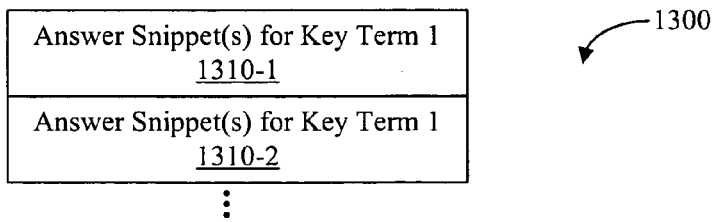
FIG. 13 is a block diagram illustrating an embodiment of a data structure containing answer snippets.

FIG. 13 is a block diagram illustrating an embodiment of a data structure containing answer snippets 1300. The data structure containing answer snippets 1300 includes one or more answer snippets corresponding to a respective key term(s) 1310.

FIG. 14 illustrates an embodiment of a synonym data structure 1500. The synonym data structure 1500 may include multiple entries 1510. The synonym data structure 1500 may include term 1514, synonym 1516 and weight 1518. The synonym data structure 1500 may be used in generating the search pattern.

There are a variety of ways of formatting the response from the search engine to the user for a fill-the-blank query. Snippets of text, such as sentences or other text segments, in a ranked set of information items may be presented. The ranking of the information items may be based on the final scores for respective documents in the set of documents. In some embodiments, identified content in the snippets of text may be highlighted. Another possibility includes a list or a table with various identified content (in information items having high rank values) replacing one or more of the missing terms in the fill-the-blank query. The user may also be able to select a respective information item in the ranked set of information items and receive a ranked set of corresponding documents containing the identified content.

Figure 15A:
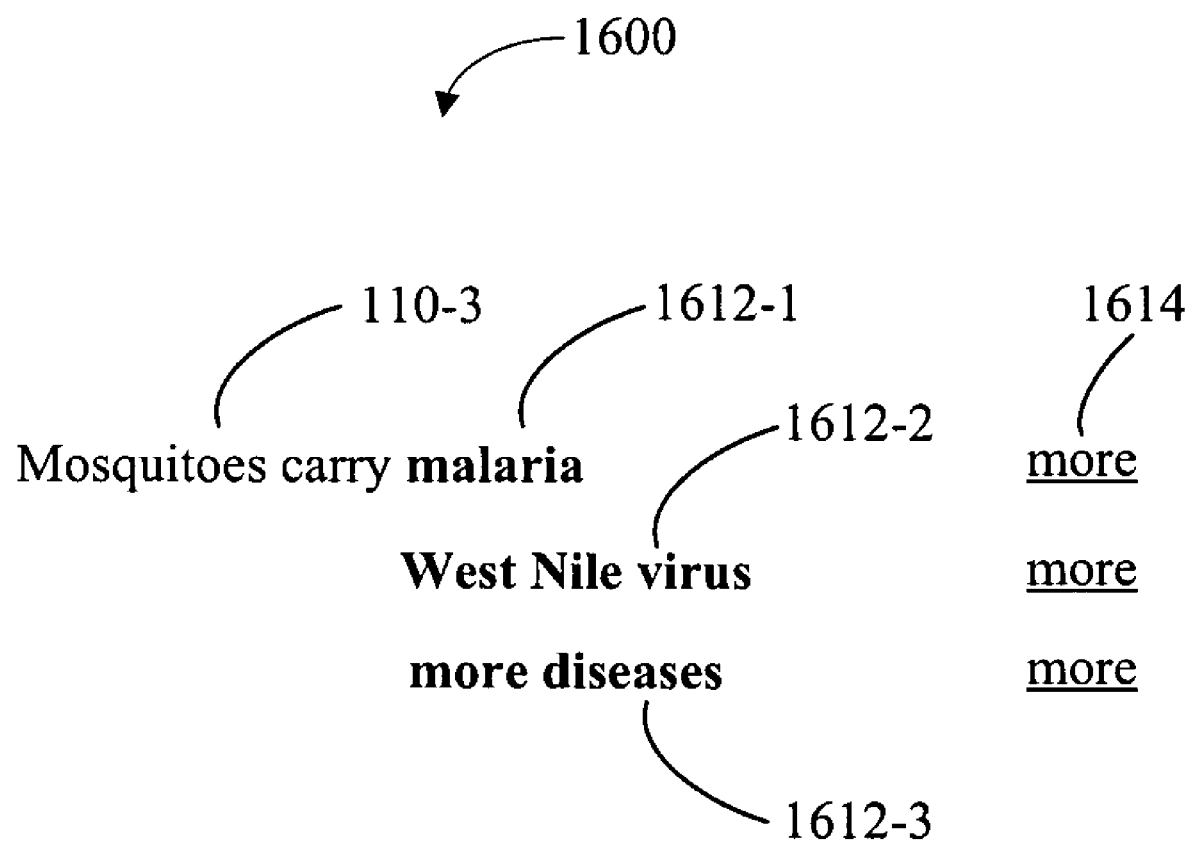
FIG. 15A is a block diagram illustrating an embodiment of a ranked set of information items.
Figure 15B:
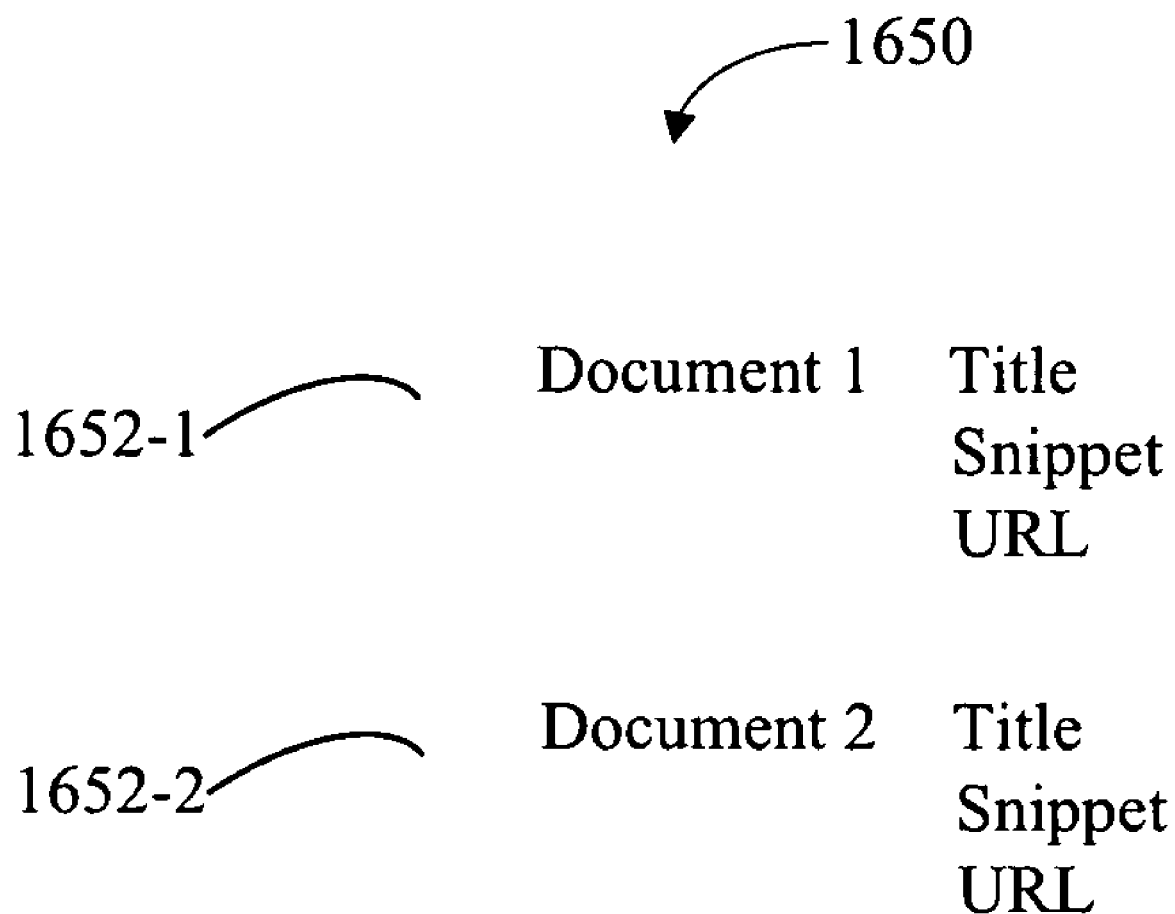
FIG. 15B is a block diagram illustrating an embodiment of a ranked set of information items.

FIG. 15A illustrates an embodiment of a ranked set of information items 1600. Term segment 110-3 and identified content 1612 are presented to the user. Identified content 1612-3 provides a link to additional identified content. More 1614 provides links to documents that contain the identified content 1612. This is shown in FIG. 15B, which illustrates an embodiment of a ranked set of information items 1650 including documents 1652.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of searching for information, comprising:
   at a server system:
      receiving from a client system a fill-the-blank query comprising one or more term segments and one or more missing term identifiers signifying missing information sought by a user;
      converting the fill-the-blank query into a corresponding search pattern, wherein the search pattern includes: one or more missing content identifiers corresponding to the one or more missing term identifiers, and a set of one or more query expressions corresponding to each term segment;
      identifying a set of documents matching the search pattern;
      identifying content in the set of documents corresponding to the search pattern, the identified content including one or more potential answers corresponding to the one or more missing term identifiers; and
      responding to the query by providing to the client system at least one of the one or more potential answers.

2. The method of claim 1, including determining match scores for one or more matches between the search pattern and documents in the set of documents;
   wherein responding to the query includes providing a ranked set of information items containing the identified content in accordance with the match scores.

3. The method of claim 2, wherein providing at least one of the one or more potential answers includes providing a ranked list of documents containing the identified content in accordance with the match scores.

4. The method of claim 2, further comprising determining document scores for the set of documents, wherein a respective document score is based on a highest match score and a total number of matches between the search pattern and the respective document in the set of documents.

5. The method of claim 4, wherein the respective document score is further based on a quality of document metric.

6. The method of claim 4, wherein the respective document score is a weighted summation of the highest match score, the total number of matches between the search pattern and the respective document, and a quality of document metric.

7. The method of claim 4, further comprising
   determining, for the identified content in the respective document, a relative frequency of the identified content in the set of documents; and
   determining final scores for the set of documents, wherein a respective final score for a respective document in the set of documents is based on the respective document score for the respective document and the relative frequency for the identified content in the respective document.

8. The method of claim 7, wherein the respective final score for a respective document in the set of documents is a weighted product of the relative frequency for the identified content in the respective document and the respective document score for the respective document.

9. The method of claim 2, wherein a respective match score for a respective document in the set of documents is based on a uniqueness metric for the identified content in the respective document and a uniqueness metric for padding between the one or more query expression in the search pattern.

10. The method of claim 9, wherein the respective match score is further based on weights of one or more synonyms used in converting one or more term segments in the sequence of terms into one or more query expressions.

11. The method of claim 10, wherein the respective match score is a weighted summation of the uniqueness metric for the identified content in the respective document, the uniqueness metric for padding between the one or more query expression in the search pattern and the weights of the one or more synonyms.

12. The method of claim 1, further comprising receiving one or more context terms that identify a category for the one or more potential answers and using the context terms for further processing selected from the group consisting of determining rankings of the potential answers, including the one or more context of terms in the search pattern, and filtering the identified set of documents.

13. The method of claim 1, wherein the converting one or more of the term segments into respective query expressions includes mapping one or more term segments into one or more paraphrases.

14. The method of claim 1, further comprising specifying one or more ordering constraints wherein the ordering constraints specify one or more re-orderings of the term segments in the sequence of terms.

15. The method of claim 1, wherein the identifying content includes limiting a length of the content in accordance with a uniqueness metric of candidate terms for the content.

16. The method of claim 15, wherein the uniqueness metric is an inverse of a number of documents in the set of documents in which a respective candidate term appears.

17. The method of claim 1, wherein a length of the identified content is less than a pre-determined value.

18. The method of claim 1, further comprising providing for display snippets of text containing the one or more potential answers, wherein the one or more potential answers are highlighted.

19. The method of claim 1, wherein the fill-the-blank query includes a respective missing term identifier located between two respective term segments.

20. A computer-program product, comprising:
a computer readable storage medium and a computer program mechanism embedded therein, the computer program mechanism comprising:
instructions for receiving a fill-the-blank query comprising one or more term segments and one or more missing term identifiers signifying missing information sought by a user;
instructions for converting the fill-the-blank query into a corresponding search pattern, wherein the search pattern includes: one or more missing content identifiers corresponding to the one or more missing term identifiers, and a set of one or more query expressions corresponding to each term segment;
instructions for identifying a set of documents matching the search pattern;
instructions for identifying content in the set of documents corresponding to the search pattern, the identified content including one or more potential answers corresponding to the one or more missing term identifiers; and
instructions for responding to the query by providing at least one of the one or more potential answers.

21. The computer program product of claim 20, including instructions for determining match scores for one or more matches between the search pattern and documents in the set of documents;
wherein instructions for responding to the query include instructions for providing a ranked set of information items containing the identified content in accordance with the match scores.

22. The computer program product of claim 21, wherein providing at least one of the one or more potential answers includes providing a ranked list of documents containing the identified content in accordance with the match scores.

23. The computer program product of claim 20, further comprising instructions for receiving one or more context terms that identify a category for the potential answers and instructions for using the context terms for further processing selected from the group consisting of determining rankings of the potential answers, including the one or more context of terms in the search pattern, and filtering the identified set of documents.

24. The computer program product of claim 20, further comprising instructions for providing for display snippets of text containing the one or more potential answers wherein the one or more potential answers are highlighted.

25. The computer program product of claim 20, wherein the fill-the-blank query includes a respective missing term identifier is located between two respective term segments.

26. A computer system, comprising:
memory;
one or more processors; and
one or more programs stored in the memory and executed by the one or more processors, the one or more programs including:
instructions for receiving from a client system a fill-the-blank query comprising one or more term segments and one or more missing term identifiers signifying missing information sought by a user;
instructions for converting the fill-the-blank query into a corresponding search pattern, wherein the search pattern includes: one or more missing content identifiers corresponding to the one or more missing term identifiers, and a set of one or more query expressions corresponding to each term segment;
instructions for identifying a set of documents matching the search pattern;
instructions for identifying content in the set of documents corresponding to the search pattern, the identified content including one or more potential answers corresponding to the one or more missing term identifiers; and
instructions for responding to the query by providing to the client system at least one of the one or more potential answers.

27. The system of claim 26, including instructions for determining match scores for one or more matches between the search pattern and documents in the set of documents;
wherein instructions for responding to the query include instructions for providing a ranked set of information items containing the identified content in accordance with the match scores.

28. The system of claim 27, wherein providing at least one of the one or more potential answers includes providing a ranked list of documents containing the identified content in accordance with the match scores.

29. The system of claim 26, further comprising instructions for receiving one or more context terms that identify a category for the one or more potential answers and instructions for using the context terms for further processing selected from the group consisting of determining rankings of the potential answers, including the one or more context of terms in the search pattern, and filtering the identified set of documents.

30. The system of claim 26, further comprising instructions for providing for display snippets of text containing the one or more potential answers wherein the one or more potential answers are highlighted.

31. The computer system of claim 26, wherein the fill-the-blank query includes a respective missing term identifier is located between two respective term segments.

* * * * *